(12) United States Patent
Mueck

(10) Patent No.: US 9,972,196 B2
(45) Date of Patent: May 15, 2018

(54) ISOLATOR SYSTEM WITH STATUS DATA INTEGRATED WITH MEASUREMENT DATA

(71) Applicant: Analog Devices, Inc., Norwood, MA (US)

(72) Inventor: Michael Mueck, Andover, MA (US)

(73) Assignee: Analog Devices, Inc., Norwood, MA (US)

(*) Notice: Subject to any disclaimer, the term of this patent is extended or adjusted under 35 U.S.C. 154(b) by 784 days.

(21) Appl. No.: 13/670,364

(22) Filed: Nov. 6, 2012

(65) Prior Publication Data

US 2013/0278438 A1  Oct. 24, 2013

Related U.S. Application Data

(60) Provisional application No. 61/636,797, filed on Apr. 23, 2012.

(51) Int. Cl.
| | |
|---|---|
| *G08B 21/00* | (2006.01) |
| *G08C 15/00* | (2006.01) |
| *H04Q 9/00* | (2006.01) |
| *G08C 15/06* | (2006.01) |
| *G08C 17/06* | (2006.01) |
| *H04B 5/00* | (2006.01) |
| *H04L 25/02* | (2006.01) |

(52) U.S. Cl.
CPC .............. *G08C 15/00* (2013.01); *G08C 15/06* (2013.01); *G08C 17/06* (2013.01); *H04B 5/00* (2013.01); *H04L 25/0266* (2013.01); *H04Q 9/00* (2013.01); *H04Q 2209/883* (2013.01)

(58) Field of Classification Search
CPC ...................................................... G08C 15/00
USPC ........................................ 340/870.01, 870.16
See application file for complete search history.

(56) References Cited

U.S. PATENT DOCUMENTS

| 4,845,421 A | 7/1989 | Howarth et al. |
| 4,901,275 A | 2/1990 | Hardie et al. |
| 5,384,808 A | 1/1995 | Van Brunt et al. |

(Continued)

FOREIGN PATENT DOCUMENTS

| CN | 1830199 A | 9/2006 |
| CN | 101965686 A | 2/2011 |

(Continued)

OTHER PUBLICATIONS

Analog Devices, "Isolated Sigma-Delta Modulator", AD7400 Datasheet, Rev. G., Jun. 2013, 20 pages.

(Continued)

*Primary Examiner* — Amine Benlagsir
(74) *Attorney, Agent, or Firm* — Wolf, Greenfield & Sacks, P.C.

(57) ABSTRACT

An isolator system is disclosed in which a pair of circuit systems is separated by an isolation barrier but engage in mutual communication by an isolator device that bridges the isolation barrier. A first circuit system may include a measurement system generating measurement data and status monitor generating status data. The first circuit system also may include a communication system that multiplexes the measurement data and the status data for transmission across a common isolator device. In this manner, the number of isolator devices may be reduced over conventional designs.

36 Claims, 7 Drawing Sheets

(56) References Cited

U.S. PATENT DOCUMENTS

| | | |
|---|---|---|
| 5,594,329 A | 1/1997 | van Ettinger et al. |
| 5,886,573 A | 3/1999 | Kolanek |
| 5,940,447 A | 8/1999 | Connell et al. |
| 5,952,849 A | 9/1999 | Haigh |
| 6,167,132 A | 12/2000 | Krone et al. |
| 6,262,600 B1 | 7/2001 | Haigh et al. |
| 6,359,983 B1 | 3/2002 | Krone et al. |
| 6,519,339 B1 | 2/2003 | Sacca et al. |
| 6,873,065 B2 | 3/2005 | Haigh et al. |
| 6,922,080 B2 | 7/2005 | Haigh et al. |
| 7,061,421 B1 | 6/2006 | Xiao et al. |
| 7,075,329 B2 | 7/2006 | Chen et al. |
| 7,447,492 B2 | 11/2008 | Dupuis |
| 7,515,076 B1 | 4/2009 | Singh et al. |
| 7,545,059 B2 | 6/2009 | Chen et al. |
| 7,675,444 B1 | 3/2010 | Smith et al. |
| 7,738,568 B2 | 6/2010 | Alfano et al. |
| 8,089,311 B2 | 1/2012 | Chen |
| 8,736,343 B2 | 5/2014 | Chen et al. |
| 2004/0080885 A1 | 4/2004 | Gaksch et al. |
| 2004/0239487 A1 | 12/2004 | Hershbarger |
| 2004/0264941 A1 | 12/2004 | Hirasaka |
| 2005/0172063 A1* | 8/2005 | Hofmann ............ G06F 13/4265 710/306 |
| 2006/0199620 A1 | 9/2006 | Greene et al. |
| 2008/0163000 A1* | 7/2008 | McKim ............ G01B 31/31859 714/34 |
| 2008/0198904 A1 | 8/2008 | Chang |
| 2008/0267301 A1 | 10/2008 | Alfano et al. |
| 2009/0113222 A1 | 4/2009 | Lee |
| 2009/0168462 A1* | 7/2009 | Schopfer ............ H02M 3/33523 363/21.01 |
| 2009/0212759 A1 | 8/2009 | Melanson |
| 2009/0243683 A1 | 10/2009 | Ochi et al. |
| 2010/0141282 A1 | 6/2010 | Heath et al. |
| 2010/0246646 A1 | 9/2010 | Gaalaas |
| 2010/0250820 A1* | 9/2010 | Gaalaas et al. ............ 710/305 |
| 2011/0189952 A1 | 8/2011 | Barrenscheen et al. |
| 2012/0139358 A1 | 6/2012 | Teggatz et al. |
| 2013/0027107 A1 | 1/2013 | Nohara |
| 2013/0088264 A1 | 4/2013 | Barrenscheen et al. |
| 2013/0201050 A1 | 8/2013 | Hellsten |
| 2013/0279611 A1 | 10/2013 | Mueck et al. |
| 2013/0294111 A1* | 11/2013 | Persson et al. ............ 363/16 |

FOREIGN PATENT DOCUMENTS

| | | | |
|---|---|---|---|
| EP | 1 309 144 A1 | 5/2003 | |
| EP | 1742337 A2 | 1/2007 | |
| EP | 1978625 A2 | 10/2008 | |
| EP | 2166660 A2 | 3/2010 | |
| WO | WO 94/16390 A1 | 7/1994 | |
| WO | 98/09411 A1 | 3/1998 | |
| WO | WO 9809411 A1 * | 3/1998 | ......... G06K 7/10336 |
| WO | 2004112371 A1 | 12/2004 | |
| WO | WO 2007/002827 A2 | 1/2007 | |
| WO | 2009108603 A1 | 9/2009 | |
| WO | WO 2009108603 A1 * | 9/2009 | |

OTHER PUBLICATIONS

Analog Devices, "Using the AD7400A Isolated Sigma-Delta Modulator as an Isolated Amplifier", 2 pages, 2009.
Analog Devices, "Converters for Motor Control", 8 pages, 2005.
Extended European Search Report dated Feb. 24, 2016, in European Application No. 13164184.7 (8 pages).
Extended European Search Report dated Feb. 5, 2016, in European Application No. 13164191.2 (9 pages).
U.S. Appl. No. 13/784,508, filed Mar. 4, 2013, Mueck et al.
Extended European Search Report dated Apr. 15, 2016 for Application No. EP 13164287.8.

\* cited by examiner

100

200

400

500

600

ISOLATOR SYSTEM WITH STATUS DATA INTEGRATED WITH MEASUREMENT DATA

CROSS REFERENCE TO RELATED APPLICATION

The present invention benefits from priority afforded by U.S. patent application Ser. No. 61/636,797, entitled "Isolated Measurement System," filed Apr. 23, 2012, the disclosure of which is incorporated herein in its entirety.

BACKGROUND

An isolated measurement system typically includes a measurement system to measure external signals and a control system to control the measurement system and receive measurement data therefrom. The two systems operate in two different voltage domains that are galvanically isolated from each other. The measurement system often includes multiple channels, each with its own measurement system and converter. Each channel transmits sampled data, in an asynchronous manner, to the control system through a respective data communication transformer.

A power generator provided in a voltage domain of the control system generates power for a voltage domain of the measurement system. The power generator includes a power transmitter in the control system's domain coupled to a rectifier in the measurement system's domain via a transformer that bridges an isolation barrier between the two domains. The power transmitter and rectifier are active continuously to ensure power supply to the measurement system is continuous. A power monitor may measure a voltage supply provided by the rectifier and may generate power feedback data therefrom, which is communicated to the control system's domain via a dedicated isolation transformer.

Modern applications of isolated measurement systems provide separate signaling paths for measurement data and power feedback data within the system. Thus, measurement systems may generate data that is communicated across an isolation barrier through a first set of isolators, typically one isolator per measurement channel. Power monitors may generate power feedback information that may be communicated across the isolation barrier through another isolator. Isolator devices, however, consume significant area and cost when the systems are manufactured. The inventors have identified a need for such a system in which communication of power feedback data makes efficient use of isolators and minimizes area and cost.

DETAILED DESCRIPTION

Embodiments of the present invention provide a system in which a pair of circuit systems are separated by an isolation barrier but engage in mutual communication by isolator devices that bridge the isolation barrier. A first circuit system may include a measurement system generating measurement data and a status monitor generating status data. The first circuit system also may include a communication system that multiplexes the measurement data and the status data for transmission across a common isolator device. In this manner, the number of isolator devices may be reduced over conventional designs.

Figure 1:
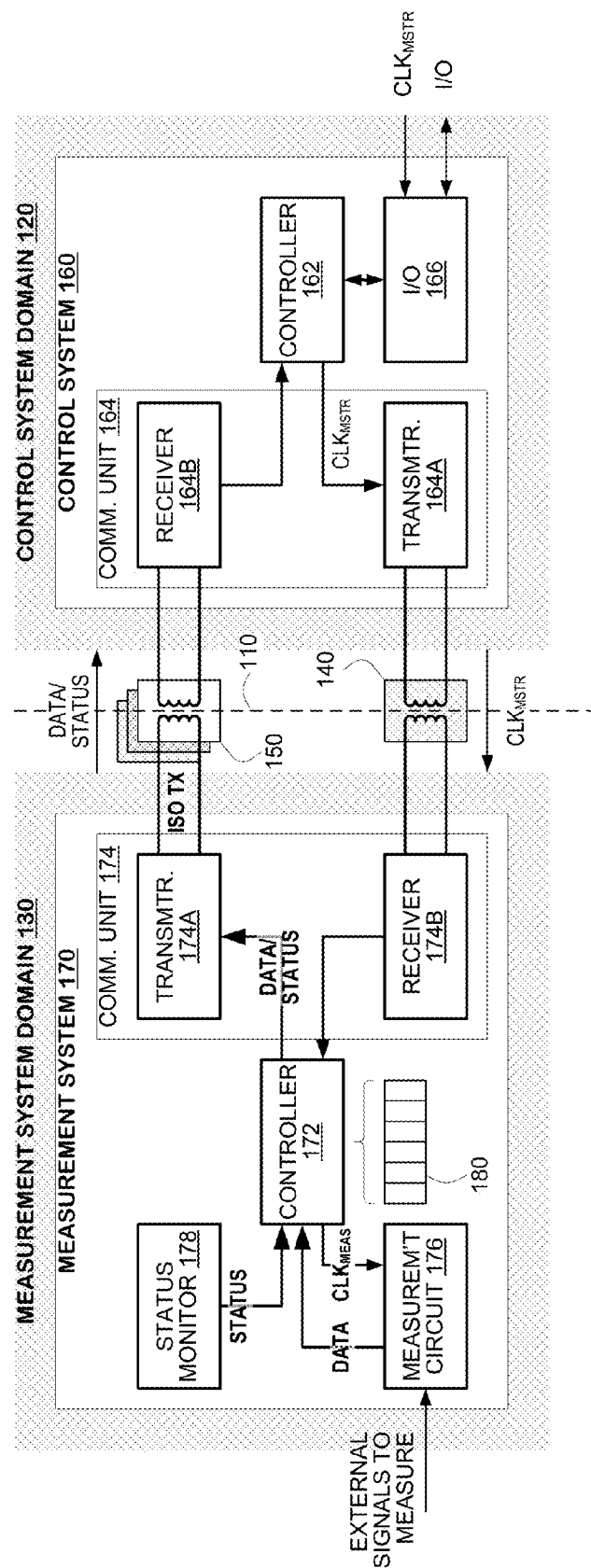
FIG. 1 illustrates an isolated measurement system according to an embodiment of the present invention.

FIG. 1 illustrates an isolated measurement system 100 according to an embodiment of the present invention. The system 100 may define an isolation barrier 110 that establishes two galvanically isolated voltage domains 120, 130. Each voltage domain 120, 130 may have voltage supplies and ground references that are isolated from each other. The system 100 also may include various isolator devices 140, 150 to exchange timing signals and data between the voltage domains 120, 130 while still maintaining galvanic isolation between them. In the system 100 illustrated in FIG. 1, the first voltage domain 120 may include a control system 160 to manage operations of the system 100 and, therefore, it is called a "control system domain" herein. The second voltage domain 130 may include a measurement system 170 and, therefore, it is called a "measurement system domain" herein.

The control system 160 and measurement system 170 may exchange communication with each other via the isolators 140, 150. The communication may include exchange of control signals, timing signals and/or data. The isolators 140, 150 may be implemented as capacitors, transformers and/or opto-electronic devices. A pair of isolators 140, 150 is shown in FIG. 1 where one isolator 140 carries control signals from the control system 160 to the measurement system 170 and a second isolator 150 carries data signals (described below) from the measurement system 170 to the control system 160. In the example of FIG. 1, a single isolator 140, 150 is shown for communication in each direction but the principles of the present invention are not so limited. The system 100 may include a larger number of isolators, particularly for communication of data from the measurement system 170 to the control system 160, to provide higher bandwidth communication. Moreover, one or more of the isolators 140, 150 may be provided as bidirectional isolators.

FIG. 1 illustrates components of an exemplary control system 160, which may include a controller 162, a communication unit 164, and an input/output ("I/O") unit 166. The controller 162 may manage operation of the control system 160 and may generate timing references (shown as $CLK_{M\text{-}STR}$) for components within the control system 160 and within the measurement system 170. The communication unit 164 may exchange bidirectional communication signals with the measurement system 170 via the isolators 140, 150. The I/O unit 166 may interface with processors and/or controllers external to the system 100 (not shown) which may enable transmission of data from the measurement system 100 reception of command(s) for management of the measurement system 100 and/or timing information (shown as CLK).

FIG. 1 illustrates components of an exemplary measurement system 170, which may include a controller 172, a communication unit 174, measurement circuit(s) 176 and a status monitor 178. The controller 172 may manage operation of the measurement system 170 and may generate timing references for other components of the measurement system 170. The communication unit 174 may exchange bidirectional communication signals with the control system 160 of the control system domain 120 across isolators 140, 150. The measurement circuit 176 and status monitor 178 each may generate data to be communicated from the measurement system 170 to the control system 160.

The measurement circuit 176 represents circuitry to measure various external signals input to the system 100 for a test subject (not shown). By way of example, the measurement circuits 176 may include one or more analog-to-digital converters ("ADCs") (not shown) to digitize externally provided voltages, each of which may be single or multi-bit ADCs (not shown). For example, the measurement circuit 176 may include one or more sigma-delta ("ΣΔ") ADCs. The measurement circuit 176 may perform its operations according to a measurement clock signal $CLK_{MEAS}$ provided by the controller 172.

The status monitor 178 may monitor operational status of the measurement system 170 and may generate feedback data representing such status for transmission to the control system 170. In this regard, the controller 172 may include one or more storage register(s) 180 to store status information and measurement data that is to be reported back to the control system 160. Status information may include error indicators representing malfunction of the measurement system, detection of an input signal that exceeds maximum or minimum threshold limits, state of voltage supplies within the measurement system, or other operational data indicating whether components of the measurement system 170 are operating properly.

The controller 172 may generate drive signals to the communication unit 174 to communicate the status information and measurement data across a common isolator 150 (or set of isolators). The controller 172 also may interpret signals received from the communication unit 174 to generate the timing signals $CLK_{MEAS}$ that governs operation of the measurement circuits 176 as the clock.

The communication units 164, 174 each may include a transmitter 164A, 174A and a receiver 164B, 174B. The transmitters 164A, 174A may receive drive signals from their respective controllers 162, 172 and may generate drive signals that are appropriate for transmission to the respective isolators 140, 150. The receivers 164B, 174B may receive signals from their respective isolators 140, 150 and generate output signals to their respective controllers 162, 172. For example, in the case of transformer-based isolators, the transmitters 164A, 174A may receive digital input signals and generate pulsed signals that are amenable for transmission across the isolators. Such pulsed signals may be transmitted across the isolators 140, 150 to receivers, which may generate digital output signals therefrom.

The isolator system 100 of FIG. 1 provides advantages over convention isolator designs in that a dedicated isolator need not be provided for status information. In conventional designs, a dedicated isolator had been provided for status information, which was separate from the isolator(s) provided for reporting of measurement data. The design of the present invention permits status information to be merged with measurement data and communicated across the isolator barrier 110 over a common isolator 150 (or set of isolators). The designs of the present invention, therefore, permit the isolator system 100 to be manufactured using fewer numbers of isolators than in prior designs. Isolators tend to be very large components when fabricated and, therefore, the designs of the present invention contribute to area conservation, lower cost and smaller package sizes.

Figure 2:
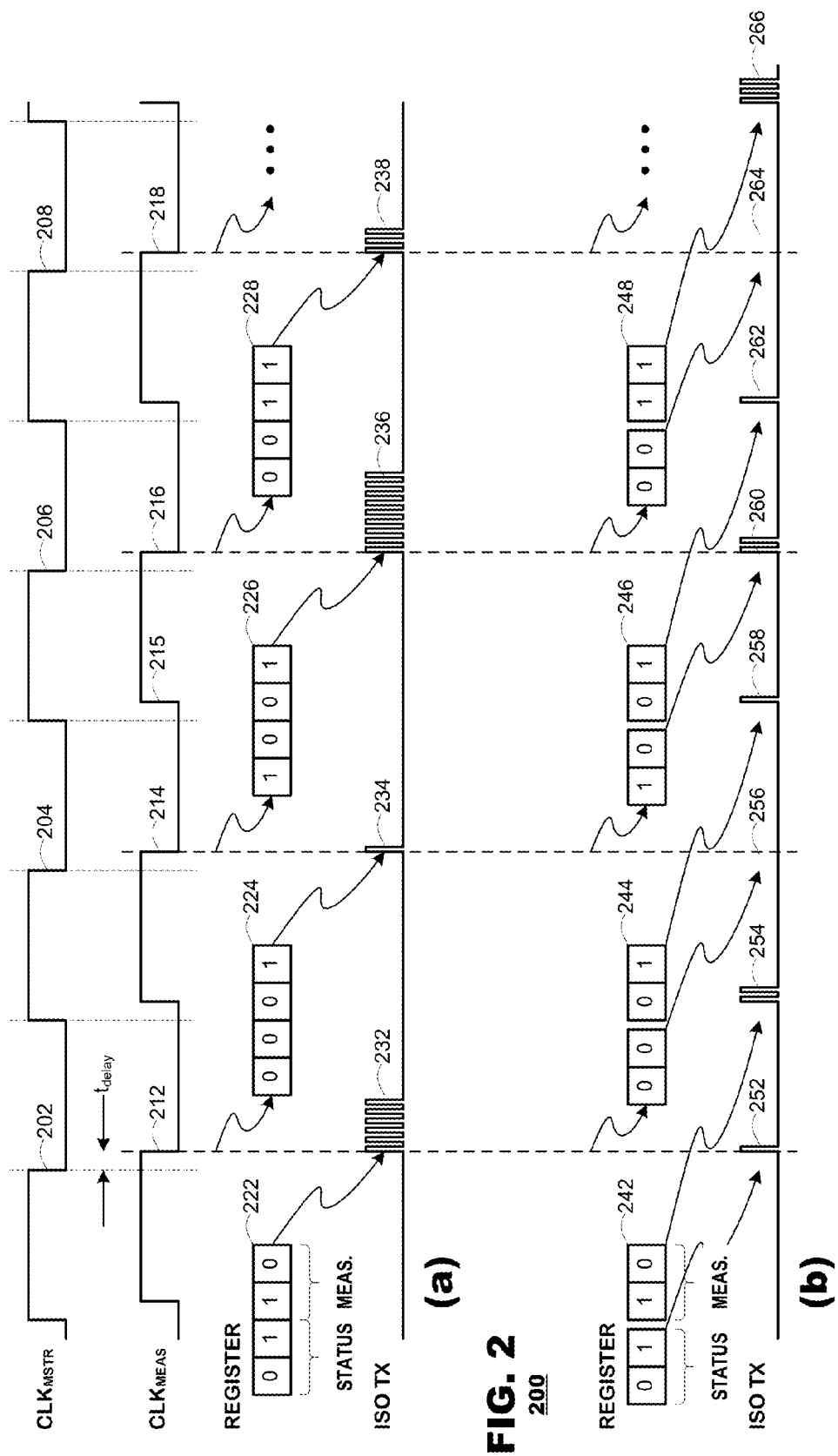
FIG. 2 is a timing diagram illustrating exemplary signals that may be communicated within the system FIG. 1.

FIG. 2 is a timing diagram 200 illustrating exemplary signals that may be communicated within the system 100 of FIG. 1. FIG. 2 (a) illustrates a master clock signal $CLK_{MSTR}$, a measurement clock signal $CLK_{MEAS}$, exemplary data stored in a register 180 (FIG. 1), and a data signal that may be transmitted across a return isolator 150. The master clock signal $CLK_{MSTR}$ may be generated by a controller 162 within the control system domain 120 (FIG. 1). The master clock signal $CLK_{MSTR}$ may be communicated to the measurement system 170 by the communication units 164, 174 and the isolator 150. The controller 172 within the measurement system domain 130 may derive the measurement clock signal $CLK_{MEAS}$ from the communicated $CLK_{MSTR}$ signal.

Edges 202-208 within the master clock signal $CLK_{MSTR}$ may be replicated as corresponding edges 212-218 of the measurement clock signal $CLK_{MEAS}$ with a delay $t_{delay}$ imposed by the communication and derivation operations performed by intermediate circuitry 150, 164, 174. For example, the communication unit 174 may convert rising and falling edges of the $CLK_{MSTR}$ signal to pulses or other transmission signals that are appropriate for transmission via a communication isolator 140 and the communication unit 164 and controller 172 may generate a recovered clock signal $CLK_{MEAS}$ from the signals received from the communication isolator 140. Moreover, the exact amount of delay $t_{delay}$ among the edges may vary due to process, voltage and/or temperature variations of the system 100. Measurement circuits 176 may perform voltage sampling and conversion operations on edges 212-218 of the measurement clock signal $CLK_{MEAS}$, which may occur at some time after corresponding edges 202-208 of the CLKMSTR signal.

The measurement circuit 176 may perform a conversion operation on each rising and/or falling edge of the $CLK_{MEAS}$ signal. For ease of illustration, FIG. 2(a) provides an example in which conversion operations occur only on falling edges 212-218 of the $CLK_{MEAS}$ signal. Thus, on each falling edge of the $CLK_{MEAS}$ signal, new data may be stored in the controller register 180 for transmission back to the control system 160. The measurement system 170 may transmit the register's contents to the control system 160 synchronously with the $CLK_{MEAS}$ signal. Thus, if a conversion operation is performed on a falling edge 212 of the $CLK_{MEAS}$ signal, conversion data (and status data) may be transmitted to the control system 160 on a subsequent edge 214 of the $CLK_{MEAS}$ signal.

FIG. 2(a) illustrates exemplary register content and isolator transmission signals (ISO TX) that may be transmitted from this data. In this example, the register 180 may have four bits of data—two bits representing status data provided by the status monitor 178 and two other bits representing measurement data from the measurement circuit 176. The bits may be converted to digital pulses when transmitted across the isolator 150. In the example of FIG. 2(a), the digital data may be converted to a pulse train that represents the register data as if it represented a binary number. Thus, a four bit register may be converted to a pulse train having as many as 16 pulses ($2^4$=16). An N bit register may be converted to a pulse train having as many as 2N pulses.

In another embodiment, rather than transmitting back to the control system 160 once per $CLK_{MEAS}$ cycle, the measurement system 170 may transmit its data twice per cycle in half-words. Such an embodiment is illustrated in FIG. 2(b). There, the four bit register data may be split into two transmissions, which occur on rising and falling edges of each clock cycle. A first portion of register data that is captured on a falling edge 212 of the $CLK_{MEAS}$ signal may be communicated to the control system on a falling edge 214 of the $CLK_{MEAS}$ signal as a first pulse train 252 and a second portion of the register data that is captured on the falling edge 210 may be communicated on a next rising 215 edge of the $CLK_{MEAS}$ signal as a second pulse train 254 (sometimes, zero pulses may be transmitted across the isolator as determined by the register's contents). In this latter embodiment, contents of an N bit register can be transmitted in two transmissions each having a maximum of $(2^{N/2}-1)$ pulses (or a total of $2*(2^{N/2}-1)$ pulses).

Figure 3:
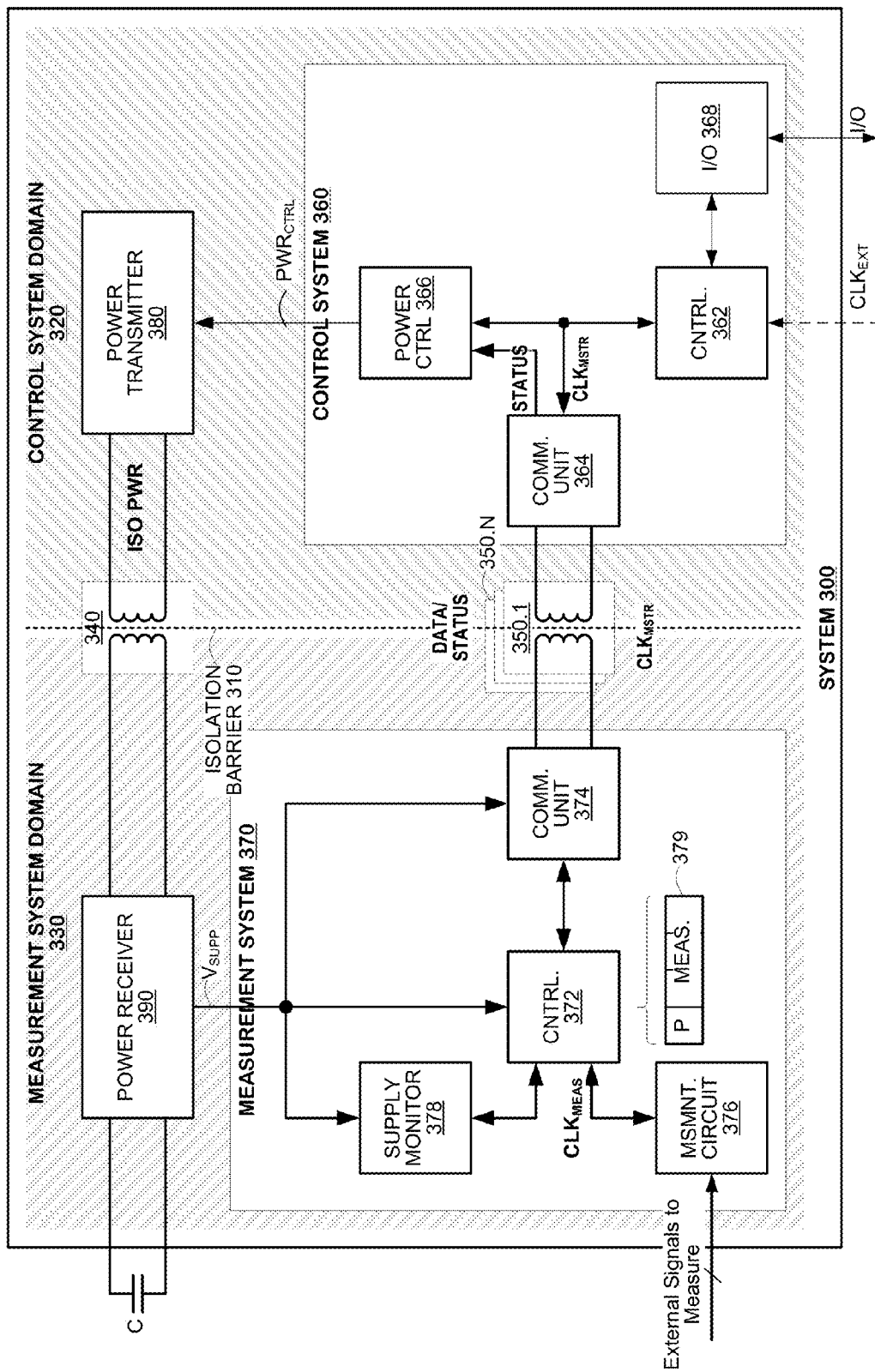
FIG. 3 illustrates an isolated measurement system according to another embodiment of the present invention.

FIG. 3 illustrates an isolated measurement system 300 according to another embodiment of the present invention. The system 300 may define an isolation barrier 310 that establishes two galvanically isolated voltage domains 320, 330. Each voltage domain 320, 330 may have voltage supplies and ground references that are isolated from each other. The system 300 also may include various isolator devices 340, 350.1-350.N to exchange power, timing and data between the voltage domains 320, 330 while still maintaining galvanic isolation between them. As in FIG. 1, the first voltage domain 320 may include a control system 360 to manage operations of the system 300 and, therefore, it is called a "control system domain" for convenience. The second voltage domain 330 may include a measurement system 370 and, therefore, it is called a "measurement system domain" herein.

The control system 360 and measurement system 370 may exchange communication with each other via communication isolators 350. The communication may include exchange of control signals, timing signals and/or data. The communication isolators 350 may be implemented as capacitors, transformers and/or opto-electronic devices. A single bidirectional communication isolator 350 is shown in FIG. 3 but the system may include other communication isolators 350, which may be unidirectional and/or bidirectional, to provide higher bandwidth communication between the voltage domains 320, 330 as may be appropriate for individual application needs.

The control system domain 320 may include a power transmitter 380 and the measurement system domain 330 may include a power receiver 390. The power transmitter 380 may have outputs connected to an input side of a power isolator 340 and the power receiver 390 may have inputs connected to an output side of the same power isolator 340. The power isolator 340 may be implemented as capacitors, transformers and/or opto-electronic devices.

The power transmitter 380 may generate an oscillating output signal (ISO PWR) to the power isolator 340 in response to a control signal $PWR_{CTRL}$. In an embodiment, the power transmitter 380 may include an inductor-capacitor based oscillator (not shown), which may set an operating frequency of the oscillating output signal ISO PWR. During operation, the $PWR_{CTRL}$ signal may activate the power transmitter 380 selectively, which may vary the amount of power conveyed to the measurement domain via the power isolator 140. In this manner, the control system 360 may regulate the voltage supply $V_{SUPP}$ at the measurement system 370.

FIG. 3 illustrates components of an exemplary control system 360, which may include a controller 362, a communication unit 364, a power controller 366 and an input/output ("I/O") unit 368. The controller 362 may manage operation of the control system 360 and may generate timing references for components within the control system 360. The communication unit 364 may exchange bidirectional communication signals with a counterpart communication unit 374 in the measurement system 370 via the communication isolator 350. The power controller 366 may control operation of the power transmitter 380. The I/O unit 368 may interface with processors and/or controllers external to the system 300 (not shown) to communicate measurement data from the measurement system 300 and/or to receive command(s) from those external components to govern operation of the system 300.

Within the control system domain 320, the control system 360 may generate timing signals to govern operation of the power transmitter 380 and the measurement system 370. The controller 362 may generate a master clock signal $CLK_{MSTR}$ from which other timing signals are derived. For example, the $CLK_{MSTR}$ signal may be communicated to the measurement system 370 via the communication units 364, 374 and a communication isolator 350, which may serve as a basis for derivation of the measurement clock signal $CLK_{MEAS}$. The controller 362 also may output the master clock signal $CLK_{MSTR}$ to the power controller 366, which may derive a power transmitter control signal $PWR_{CTRL}$ therefrom. The power transmitter control signal $PWR_{CTRL}$ may be output to the power transmitter 380 to vary the placement and duration of isolator driving signals ISO PWR applied to the communication isolator 340, which may vary the amount of power delivered to the measurement system domain 330.

FIG. 3 also illustrates components of an exemplary measurement system 370, which may include a controller 372, a communication unit 374, measurement circuit(s) 376 and a supply monitor 378. The controller 372 may manage operation of the measurement system 370 and may generate timing references for other components of the measurement system 370. The communication unit 374 may exchange bidirectional communication signals with the control system 360 of the control system domain 320 across the communication isolator(s) 350. The supply monitor 378 may measure the supply voltage $V_{SUPP}$ or, alternatively, a supply current (not shown) output by the power receiver 390 and develop feedback signals therefrom.

The measurement circuit 376 represents circuitry to measure various external signals input to the system 300 for a test subject (not shown). By way of example, the measurement circuits 376 may include one or more analog-to-digital converters ("ADCs") (not shown) to digitize externally provided voltages, each of which may be single or multi-bit ADCs (not shown). For example, the measurement circuit 376 may include one or more sigma-delta ("ΣΔ") ADCs. The measurement circuit 376 may perform its operations according to a measurement clock signal CLKMEAS provided by the controller 372.

As discussed, the supply monitor 378 may provide power measurement data to the controller 372. The supply monitor 378, for example, may include a resistor divider network and a comparator (not shown), as described in more detail below. The power control information may indicate whether the power transmitter 380 should supply more or less power to the measurement system domain 330. For example, the power control information from the supply monitor 378 may be represented by a single bit flag that is generated at periodic intervals, wherein a logic level '0' may indicate that the measurement system 370 needs less power, and a logic level '1' may indicate that the measurement system 370 needs more power. The supply monitor 378 may generate data for the control system 360, which may include power control information to manage operation of the power transmitter 380.

The controller 372 may include a register 379 to store power control information from the supply monitor 378 and measurement data from the measurement circuit 376. In the example illustrated in FIG. 3, the register 379 is shown as having a single bit for power control information and three bits for measurement data. The controller 372 may communicate contents of the register 379 to the control system 360 via the communication units 364, 374 and the communication isolator 350. By multiplexing power control data with other data, the design eliminates a need for a dedicated isolator to manage power generation and regulation, thus the number of isolators 350 for the system 300 can be reduced.

The controller 362 may parse the power measurement data and any other measurement data from communications received by the communication unit 364 and may relay the power measurement data to the power controller 366. In an embodiment, the power controller 366 may interpret the single bit power control signal as indicating a need for more power or less power. The power controller 366 may modulate the $PWR_{CTRL}$ signal according to power measurement data received from the measurement system 370.

According to embodiments of the present invention, the power controller 366 may be configured to interpret an excess number of "less power" indicators to be generated as a system error, and, in turn, may control the power transmitter 380 to generate a minimum power level to ensure proper operation of the measurement system 370. Conversely, the power controller 366 may be configured to interpret an excess number of "more power" indicators to be generated as another system error, and, in turn may control the power transmitter to generate a maximum power level for the measurement system 370. In an embodiment, the minimum and maximum power levels may be configured during manufacture of the isolated measurement system 300.

Embodiments of the present invention also may increase power generation reliability by providing for power generation states, which may provide a minimum power level needed to operate the measurement system 370 and a maximum power level, which the measurement system 370 may consume without damaging the system 300. For example, during start-up conditions when no power may be provided to the measurement system 370, the power regulation feedback information may be at a low logic level (e.g., which, during normal operation may indicate that the measurement system may need less power) because the supply monitor 378 is not yet powered.

In an embodiment, the power receiver 390 may include a full-wave rectifier (not shown) and a filtering capacitor C to generate the supply voltage $V_{SUPP}$ for the measurement system domain 320. Thus, the power receiver 390 may generate a supply voltage $V_{SUPP}$ that varies based on the operating frequency and operational duty rate of the power transmitter 380. In an embodiment, the filtering capacitor C may be provided as a discrete component that is external to an integrated circuit in which the power receiver 390 is fabricated. The power receiver 390, therefore, may provide for storage of power supplied by the power transmitter 380 and may maintain the power stable for periods of time even when the power transmitter 380 is disabled. For purposes of power transfer, the power isolator 340 may be provided as a transformer-based, capacitor-based or optical-based isolator. Isolated power generation and isolators are described in U.S. Pat. No. 8,089,311 and U.S. Pat. No. 7,075,329, the contents of which are incorporated herein.

Figure 4:
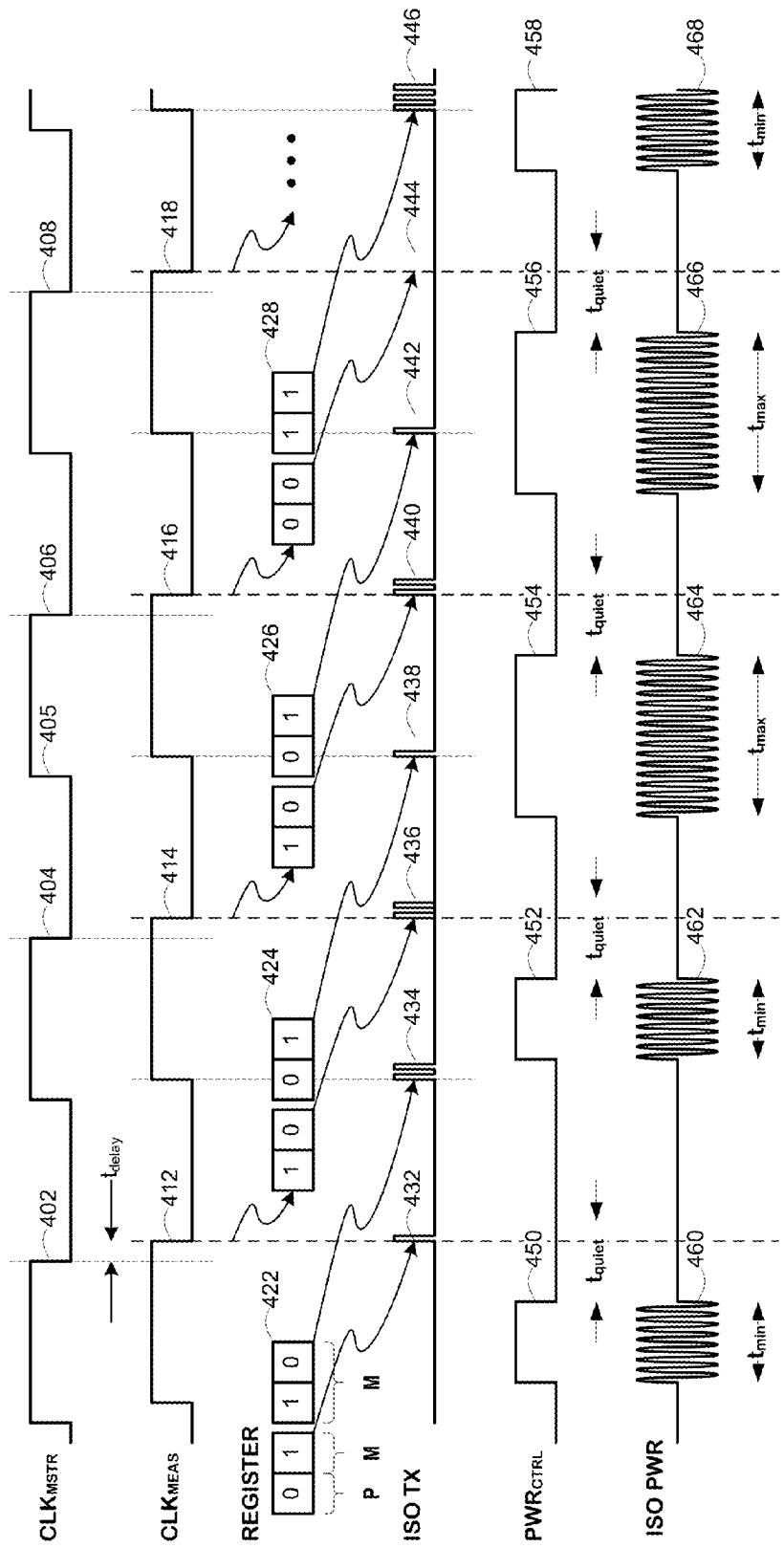
FIG. 4 is a timing diagram illustrating exemplary signals that may be communicated within the system FIG. 3.

FIG. 4 is a timing diagram 400 illustrating exemplary signals that may be communicated within the system 300 of FIG. 3. FIG. 4 illustrates a master clock signal $CLK_{MSTR}$, a measurement clock signal $CLK_{MEAS}$, exemplary data stored in a register 379 (FIG. 3), transmission signals that may be conveyed across a return isolator 350, a power control signal $PWR_{CTRL}$ and an isolator power signal ISO PWR. The master clock signal $CLK_{MSTR}$ may be generated by a controller 362 within the control system domain 320 (FIG. 3). The master clock signal $CLK_{MSTR}$ may be communicated to the measurement system 370 by the communication units 364, 374 and the isolator 350. The controller 372 within the measurement system domain 330 may derive the measurement clock signal $CLK_{MEAS}$ from the communicated $CLK_{MSTR}$ signal.

Edges 402-408 within the master clock signal $CLK_{MSTR}$ may be replicated as corresponding edges 412-418 of the measurement clock signal $CLK_{MEAS}$ with a delay $t_{delay}$ imposed by the communication and derivation operations performed by intermediate circuitry 350, 364, 374. For example, the communication unit 374 may convert edges 402-408 of the $CLK_{MSTR}$ signal to pulses (not shown) or other transmission signals that are appropriate for transmission via a communication isolator 350. The communication unit 364 and controller 374 may generate a recovered clock signal $CLK_{MEAS}$ from the signals received from the communication isolator 350. Moreover, the exact amount of delay $t_{delay}$ among the edges may vary due to process, voltage and/or temperature variations of the system 300.

Measurement circuits 376 may perform data capture operations on edges 410-414 of the measurement clock signal $CLK_{MEAS}$, which may occur at some time after corresponding edges 402-408 of the $CLK_{MSTR}$ signal. The measurement circuit 376 may perform a conversion operation on each rising and/or falling edge of the $CLK_{MEAS}$ signal. For ease of illustration, FIG. 4 illustrates an example in which conversion operations occur on falling edges 410-416 of the $CLK_{MEAS}$ signal. Thus, on each falling edge 412, 414, etc. of the $CLK_{MEAS}$ signal, new data may be stored in the controller register 380 (FIG. 3) for transmission back to the control system 360. The system may transmit the register's contents to the control system 360 synchronously with the $CLK_{MEAS}$ signal. Thus, a conversion operation that is performed on a falling edge 412 of the $CLK_{MEAS}$ signal may yield measurement data that may be transmitted to the control system 360 on next falling edge 414 of the $CLK_{MEAS}$ signal.

FIG. 4 illustrates exemplary register content and isolator transmission signals (ISO TX) that may be transmitted from this data. In this example, the register 379 may have four bits of data—one bit representing power control data provided by the supply monitor 378 and three other bits representing measurement data from the measurement circuit 376. The bits may be converted to digital pulses when transmitted across the isolator 350. In the example illustrated in FIG. 4, the register's contents may be split into two transmissions, which occur on rising and falling edges of each $CLK_{MEAS}$ clock cycle. Thus, FIG. 4 illustrates transmissions 432-446 which may be applied to a communication isolator 350 (FIG. 3) for communication back to the control system 360.

As discussed, the power controller 366 may vary the $PWR_{CTRL}$ signal based on power control feedback received from the measurement system 370. FIG. 4 illustrates the PWR$_{CTRL}$ signal being toggled between a minimum pulse length (t$_{min}$) and a maximum pulse length (t$_{max}$) in response to power control signals communicated from the measurement system 360. FIG. 4 illustrates a simplified example in which PWR$_{CTRL}$ signals are varied in one-to-one correspondence with the power control signals received from the measurement system 360. Such one-to-one correspondence need not occur in all embodiments, particularly those in which the power controller 366 includes an accumulator (not shown) that averages power control signals received over sliding windows of time. Moreover, FIG. 4 does not illustrate implementation of the minimum life support or maximum power application as discussed above.

The principles of the present invention may be used with other types of power control. For example, although the PWR$_{CTRL}$ signal is shown as toggling between minimum and maximum activation states, other embodiments permit the duration of the PWR$_{CTRL}$ signal to vary continuously between minimum and maximum durations as determined by the power control signals received from the measurement system.

FIG. 4 also illustrates activation periods of the PWR$_{CTRL}$ signal being controlled so as to avoid edges of the CLK$_{MSTR}$ and CLK$_{MEAS}$ signal that trigger high precision operations of the measurement circuits 376. In another embodiment, the PWR$_{CTRL}$ signal may be controlled to disable the power transmitter 380 at times during which the measurement system 370 performs high precision operations, such as sampling of test voltages and high precision conversion operations of ADCs within the measurement circuits 376. By disabling the power transmitter 380 during periods of high precision operations, it is expected that disturbances from the power transmitter 380 during these high precision operations, which may corrupt the measurement system 360, will be avoided.

Figure 5:
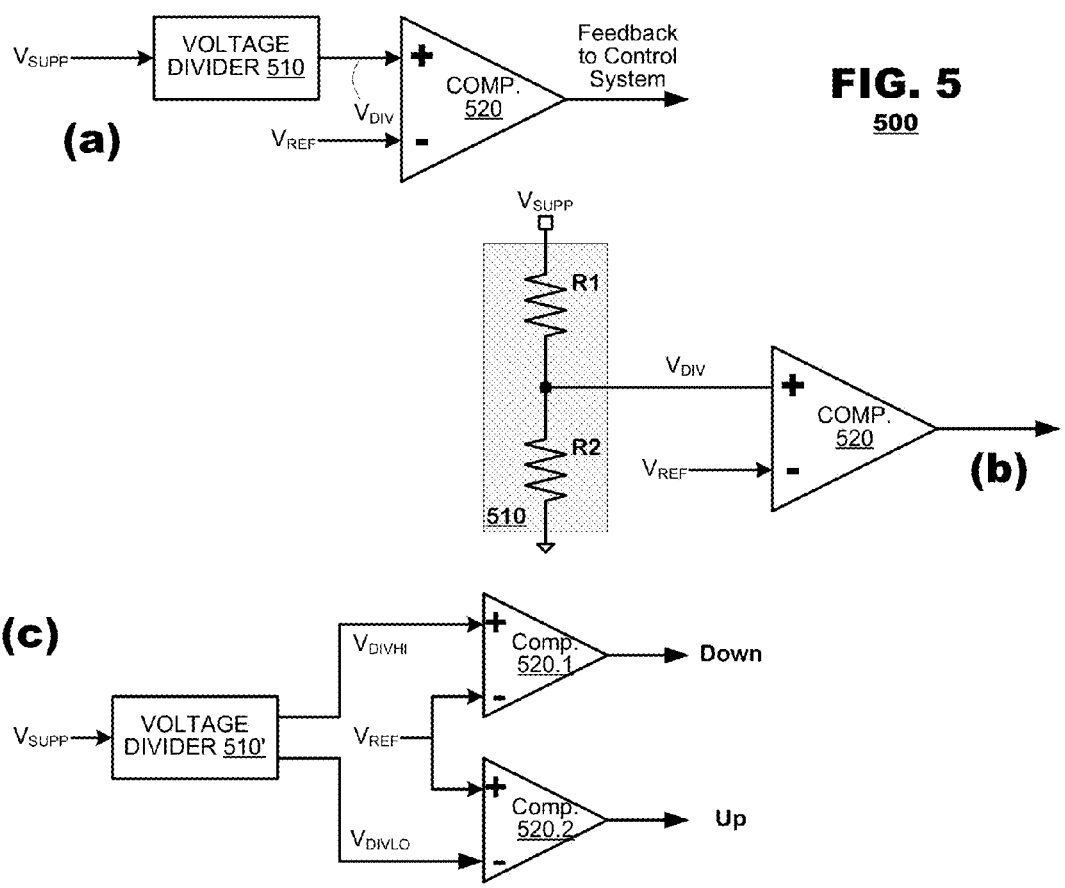
FIG. 5 contains simplified block diagrams of various supply monitors according to an embodiment of the present invention.

FIG. 5 contains simplified block diagrams of various supply monitors 500 according to an embodiment of the present invention. The supply monitor 500 may find application in the measurement system 170 of FIG. 1. As illustrated in FIG. 5(a), the supply monitor 500 may include a voltage divider 510 and a comparator 520. The voltage divider 510 may have an input coupled to the V$_{SUPP}$ voltage supply. It may divide the input voltage V$_{SUPP}$ by a scaling factor and output a voltage V$_{DIV}$, representing the divided-down voltage. In an embodiment, the voltage divider 510 may be provided as a resistor divider (FIG. 5(b)). The V$_{DIV}$ voltage may be input to a first input terminal of the comparator 520. A reference voltage V$_{REF}$ may be input to a second input terminal of the comparator 520. The reference voltage V$_{REF}$ may be a bandgap reference voltage locally generated at the measurement system 170. The comparator 520 may generate a binary output signal representing a comparison between the V$_{DIV}$ voltage and the V$_{REF}$ voltage. The comparator's output may become a power control signal within the measurement system 170 of FIG. 1.

In another embodiment, shown in FIG. 5(c), the supply monitor 500 may provide a multi-bit output that indicates three states: power should be increased, power should be decreased and power should remain unchanged. In this embodiment, the voltage divider 510' may output a pair of voltages, a high threshold V$_{DIVHI}$ and a low threshold V$_{DIVLO}$, that may be output to respective comparators 520.1, 520.2. The comparators 520.1, 520.2 also may receive the V$_{REF}$ voltage on other inputs, which again may be a bandgap reference voltage. If the V$_{DIVHI}$ voltage exceeds the V$_{REF}$ voltage, the comparator 520.1 may generate an output that indicates a power decrease is warranted. If the V$_{DIVLO}$ voltage is lower than the V$_{REF}$ voltage, the comparator 520.2 may generate an output that indicates a power increase is warranted. If neither comparator 520.1 nor 520.2 generates such outputs, it may indicate no power changed is warranted.

Figure 6A:
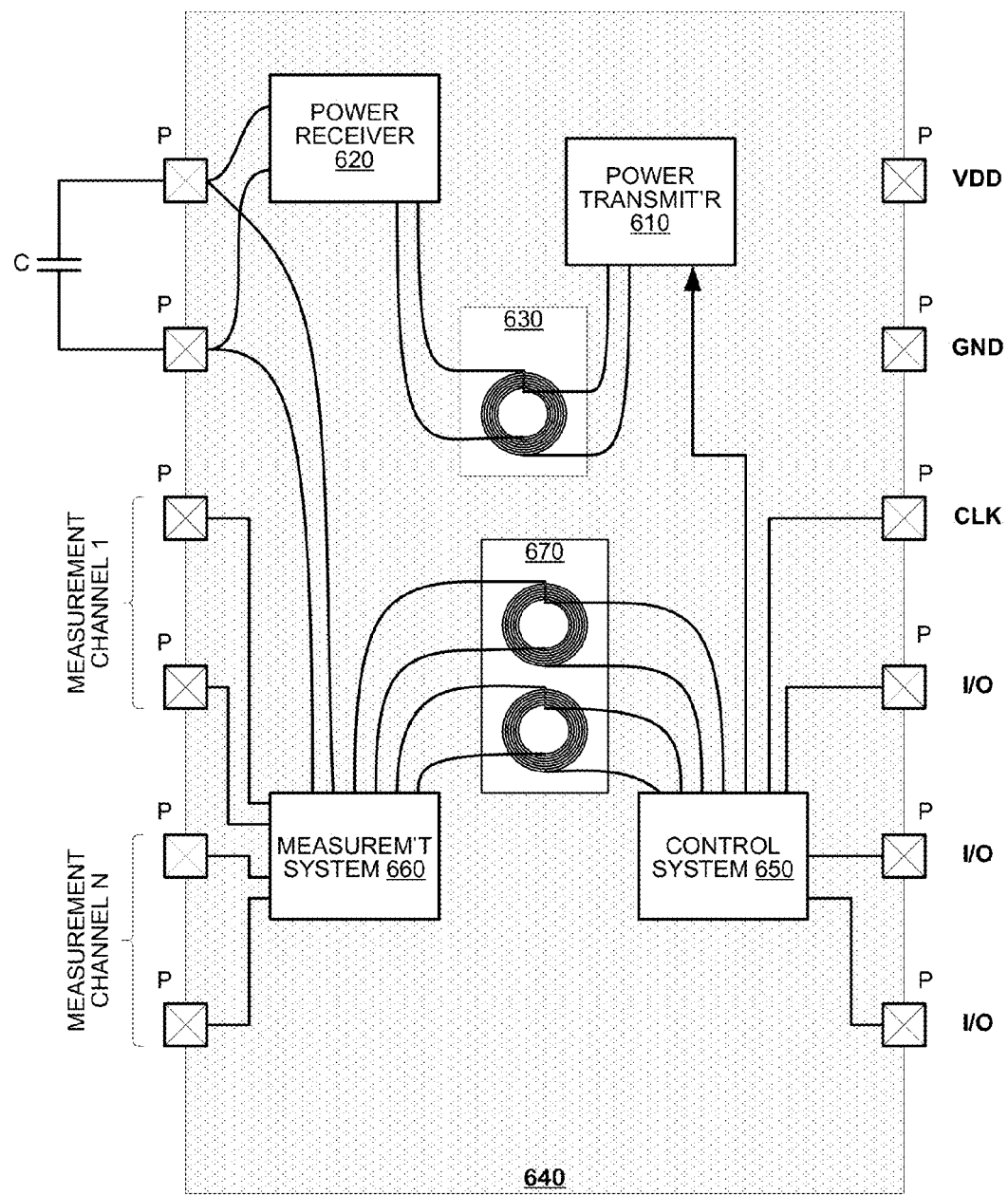
FIG. 6(a) illustrates a power generation system provided in a system-in-package configuration on a non-conductive carrier package substrate according to an embodiment of the present invention.
Figure 6B:
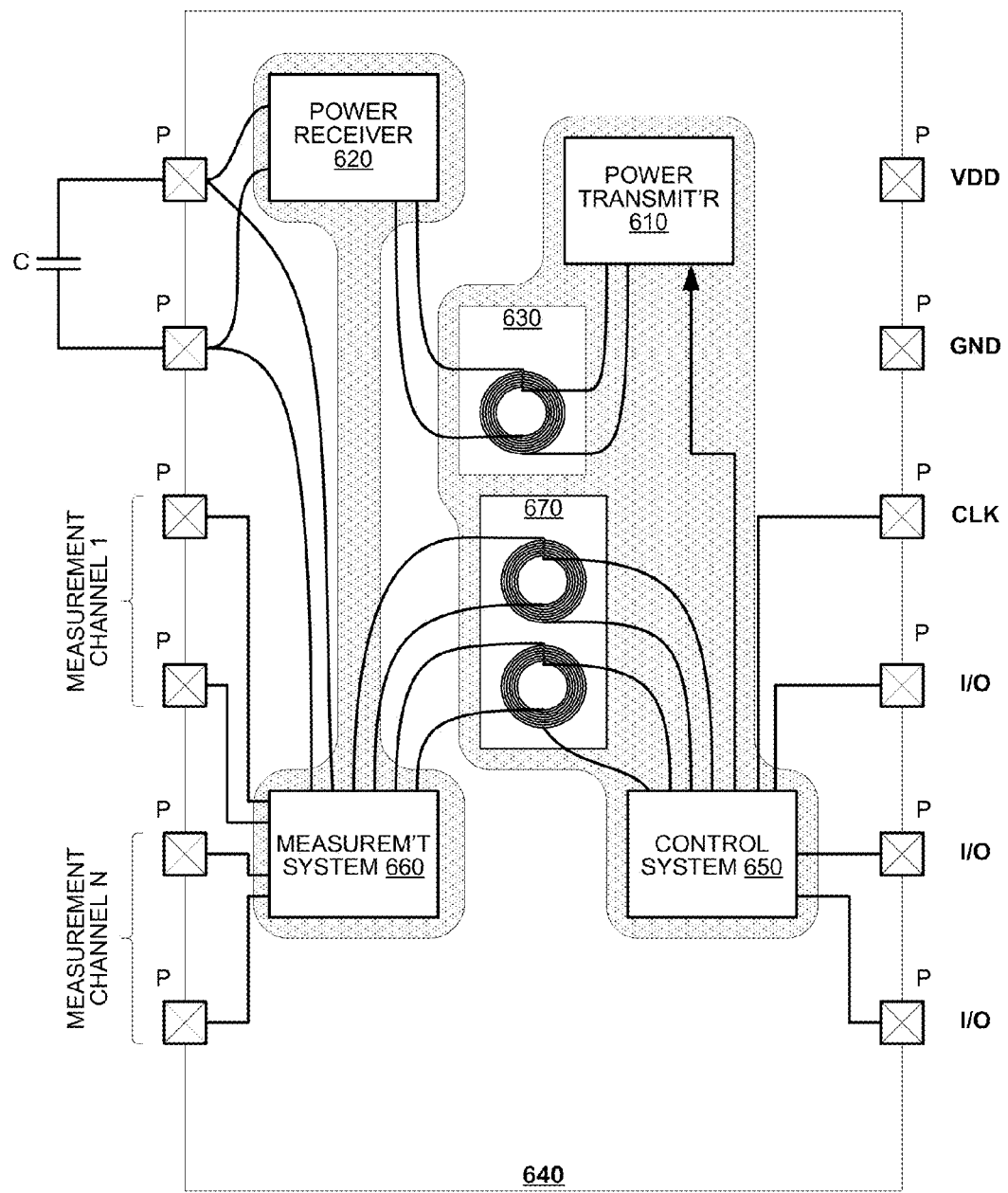
FIG. 6(b) illustrates a power generation system provided in a system-in-package configuration on a conductive split carrier package substrate according to an embodiment of the present invention.

FIG. 6 illustrates a power generation system 600 according to another embodiment of the present invention. FIG. 6 illustrates the power generation system 600 provided in a system-in-package ("SIP") configuration. In this embodiment, the power transmitter 610, power receiver 620 and power isolator 630 may be provided as separate components. The power transmitter 610 and power receiver 620 may be provided on separate semiconductor dies, which may be mounted on a package substrate 640 such as a non-conductive carrier (FIG. 6(a)) or a conductive split carrier (FIG. 6(b)). The power isolator 630 may be provided on the package substrate 640 or, alternatively, may be provided on a separate substrate that may be mounted on the package substrate 640. In the embodiment illustrated in FIG. 6, the power isolator 630 is illustrated as a micro-transformer formed of a pair of spiral conductors (not shown separately) that overlap each other on the substrate 640 and are separated by a dielectric. A first spiral conductor may be coupled to the power transmitter 610 by bridging conductors and a second spiral conductor may be coupled to the power receiver 620 also by bridging conductors. As discussed, the power isolator 630 may be formed as a capacitor network, in which case the power transmitter 610 and power receiver 620 would be coupled to respective capacitor plates by bridging conductors.

FIG. 6 also illustrates the control system 650, the measurement system 660 and the communication isolator(s) 670 provided as separate components. The control system 650 and measurement system 660 may be provided on separate semiconductor dies, which may be mounted on the package substrate 640. The communication isolator(s) 670 may be provided on the package substrate 640 or, alternatively, may be provided on a separate substrate that may be mounted on the package substrate 640. In the embodiment illustrated in FIG. 6, the communication isolators 670 are illustrated as a pair of micro-transformers each formed of a pair of spiral conductors (not shown separately) that overlap each other on the substrate 640 and are separated by a dielectric. A first spiral conductor may be coupled to the control system 650 by bridging conductors and a second spiral conductor may be coupled to the measurement system 660 also by bridging conductors.

As discussed, the communication isolator(s) 670 also may be formed as capacitive or as optical couplers. When provided as a capacitive coupler, the power transmitter 610 and power receiver 620 would be coupled to a respective capacitor plate by bridging conductors. When provided as an optical coupler, transmitters within the control system 650 and the measurement system 660 may be coupled to respective optical transmitters within the optical coupler and receivers within the control system 650 and the measurement system 660 may be coupled to respective optical receivers.

FIG. 6 illustrates an exemplary set of package pins P coupled to respectively components of the system 600. A pair of pins may be provided to couple the power receiver 620 to a discrete capacitor. Other pins may be provided for I/O communication and an external clock CLK, which may be coupled to the control system 650. Still other sets of pins may be provided for coupling test subjects to the measurement system 660. In the example of FIG. 6, two pairs of pins are provided for two test subjects (represented as "measurement channels" of the system 600). The package also may have pins for connection to supply voltages, for example, $V_{DD}$ and ground supplies for the control system 650 and power transmitter 610.

In a further embodiment, the power transmitter 610 and control system 650 may be provided in a first package and the power receiver 620 and the measurement system 660 may be provided in a second package. The isolators 630, 670 may be provided in their own, third package or, alternatively, may be provided in one of the first or second packages.

Several embodiments of the invention are specifically illustrated and/or described herein. However, it will be appreciated that modifications and variations of the invention are covered by the above teachings and within the purview of the appended claims without departing from the spirit and intended scope of the invention.

I claim:

1. An isolator system with data multiplexing, comprising:
   a pair of circuit systems including a first circuit system and a second circuit system separated by an electrical isolation barrier and communicatively coupled to each other by at least one isolator device that bridges the isolation barrier,
   the first circuit system of the pair comprising:
   a measurement system generating measurement data,
   a status monitor generating status data of a type different than the measurement data, and
   a communication system that multiplexes the measurement data and the status data in the first circuit system for transmission to the second circuit system of the pair of circuit systems across a common isolator device synchronous with a clock edge received by the first circuit system from the second circuit system of the pair of circuit systems.

2. The system of claim 1, wherein the status data represents a state of an operational voltage in the first circuit system.

3. The system of claim 1, wherein the status data indicates whether an error condition exists in the first circuit system.

4. The system of claim 1, wherein the clock edge is an edge of a master clock signal generated by the second circuit system.

5. The system of claim 4, wherein measurement operations of the first circuit system are synchronized to the master clock signal.

6. The system of claim 4, wherein the multiplexed measurement data and the status data are transmitted across the common isolator device within a single clock cycle.

7. The system of claim 4, wherein the multiplexed measurement data and the status data are provided to the isolator device as a series of pulses provided once per master clock cycle.

8. The system of claim 4, wherein the multiplexed measurement data and the status data are provided to the isolator device as a series of pulses provided twice per master clock cycle.

9. The system of claim 4, further comprising:
   a power isolator bridging the isolation barrier,
   a power transmitter provided on the second circuit system, and
   a power receiver provided in the first circuit system,
   wherein the status data includes data representing a state of a voltage generated by the power receiver, and the second circuit system modulates operation of the power transmitter in response thereto.

10. The system of claim 9, further comprising a power controller provided in the second circuit system that accumulates the status data from the first circuit system.

11. The system of claim 10, wherein the power controller provides power at a minimum level notwithstanding an excess number of status data transmissions indicating a need for lower power.

12. The system of claim 10, wherein the power controller provides power at a maximum level notwithstanding an excess number of status data transmissions indicating a need to increase power.

13. A system, comprising:
   a pair of circuit systems separated by an electrical isolation barrier;
   a first circuit system of the pair comprising:
   a power receiver,
   a measurement system generating measurement data,
   a supply monitor generating status data, of a type different than the measurement data, representing state of an electrical supply in the first circuit system, and
   a communication system that multiplexes the measurement data and the status data for transmission across the isolation barrier by a common first isolator device, synchronous with a clock edge received from a second circuit system of the pair of circuit systems; and
   the second circuit system comprising:
   a power transmitter coupled to the power receiver via a second isolator device; and
   a power controller responsive to the status data that regulates output of the power transmitter.

14. The system of claim 13, wherein the power controller provides power at a minimum level notwithstanding an excess number of status data transmissions indicating a need for lower power.

15. The system of claim 13, wherein the power controller provides power at a maximum level notwithstanding an excess number of status data transmissions indicating a need to increase power.

16. The system of claim 13, wherein the clock edge is an edge of a master clock signal for use by the first circuit system.

17. The system of claim 16, wherein the multiplexed measurement data and the status data are transmitted across the common first isolator device within a single clock cycle.

18. The system of claim 16, wherein transmissions of the first circuit system are synchronized to the master clock signal.

19. The system of claim 18, wherein the transmissions are provided to the common first isolator device as a series of pulses provided once per master clock cycle.

20. The system of claim 18, wherein the transmissions are provided to the common first isolator device as a series of pulses provided twice per master clock cycle.

21. A method, comprising:
   generating measurement data and status data by a first circuit system on a first side of an isolation barrier, the measurement data representing a result of a test performed on an input signal, and the status data representing an operational state of the first circuit system,
   multiplexing the measurement data and the status data on the first side of the isolation barrier, and
   transmitting, to a second circuit system on a second side of the isolation barrier, the multiplexed measurement data and the status data across the isolation barrier on a common isolator device synchronous with a clock edge received from the second side of the isolation barrier.

22. The method of claim 21, wherein the transmitting includes transmitting the measurement data and status data within a single clock cycle.

23. The method of claim 21, wherein the transmitting includes transmitting the measurement data and status data in a pulse sequence once per clock cycle.

24. The method of claim 21, wherein the transmitting includes transmitting the measurement data and status data in a pulse sequence twice per clock cycle.

25. The method of claim 21, wherein the status data represents states of an operational voltage in the first circuit system on the first side.

26. The method of claim 21, wherein the status data indicates whether an error condition exists in the first circuit system on the first side.

27. A system, comprising:
an isolator device that bridges an isolation barrier,
a first circuit system comprising:
a measurement system generating measurement data,
a status monitor generating status data of a type different than the measurement data, and
a communication system that multiplexes the measurement data and the status data for transmission across a common isolator device to a second circuit system synchronous with a clock edge received by the first circuit system.

28. The system of claim 27, wherein the status data represents state of an operational voltage in the first circuit system.

29. The system of claim 27, wherein the status data indicates whether an error condition exists in the first circuit system.

30. The system of claim 27, wherein the communication system receives signals representing timing of a master clock signal from across the isolation barrier and the first circuit system generates a local timing reference therefrom, wherein the clock edge is an edge of the local timing reference.

31. The system of claim 30, wherein measurement operations of the first circuit system are synchronized to the local timing reference.

32. The system of claim 30, wherein transmissions of the multiplexed measurement data and status data are sent within a single clock cycle.

33. The system of claim 32, wherein the transmissions are provided to the isolator device as a series of pulses provided once per master clock cycle.

34. The system of claim 32, wherein the transmissions are provided to the isolator device as a series of pulses provided twice per master clock cycle.

35. A system, comprising:
a pair of isolator devices that bridge an isolation barrier,
a circuit system, provided on a common side of the isolation barrier, comprising:
a power transmitter to deliver power to a first isolator device of the pair,
a communication system that receives multiplexed measurement data and status data, the status data being of a type different than the measurement data, transmitted across a second isolator device of the pair in pulse form synchronous with a clock edge generated by the circuit system,
a control system communicating the measurement data to another system, and
a power controller to modulate operation of the power transmitter based on the status data.

36. A method, comprising:
generating power delivery signals for transmission across a first isolation device,
receiving from a second isolation device power control signals multiplexed with measurement data synchronous with a clock edge transmitted across the first isolation device,
modulating the power delivery signals according to the received power control signals, wherein
the power delivery signals are provided at a minimum level notwithstanding an excess number of power control signals indicating a need for lower power, and
the power delivery signals are provided at a maximum level notwithstanding an excess number of power control signals indicating a need to increase power.

* * * * *